United States Patent
Choi et al.

(10) Patent No.: US 12,513,567 B2
(45) Date of Patent: Dec. 30, 2025

(54) SYSTEM INFORMATION BLOCK SIZING

(71) Applicant: Lenovo (Singapore) Pte. Ltd., New Tech Park (SG)

(72) Inventors: Hyung-Nam Choi, Ottobrunn (DE);
Ravi Kuchibhotla, Chicago, IL (US);
Joachim Loehr, Wiesbaden (DE);
Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 450 days.

(21) Appl. No.: 18/000,382

(22) PCT Filed: Jun. 3, 2021

(86) PCT No.: PCT/IB2021/054881
§ 371 (c)(1),
(2) Date: Nov. 30, 2022

(87) PCT Pub. No.: WO2021/245598
PCT Pub. Date: Dec. 9, 2021

(65) Prior Publication Data
US 2023/0254736 A1   Aug. 10, 2023

Related U.S. Application Data

(60) Provisional application No. 63/034,757, filed on Jun. 4, 2020.

(51) Int. Cl.
*H04W 28/06* (2009.01)
*H04L 5/00* (2006.01)

(52) U.S. Cl.
CPC ........... *H04W 28/06* (2013.01); *H04L 5/0048* (2013.01)

(58) Field of Classification Search
CPC .......................... H04W 28/06; H04L 5/0048
See application file for complete search history.

(56) References Cited

U.S. PATENT DOCUMENTS

| | | |
|---|---|---|
| 8,238,948 B2 | 8/2012 | Trogolo et al. |
| 2007/0049344 A1* | 3/2007 | Van Der Velde ..... H04W 48/12 455/560 |

(Continued)

FOREIGN PATENT DOCUMENTS

| | | |
|---|---|---|
| CN | 101674211 A | 3/2010 |
| CN | 111010740 A | 4/2020 |
| WO | WO-2016121308 A1 * | 8/2016 ........... H04L 1/0038 |

OTHER PUBLICATIONS

PCT/IB2021/054881, "Notification of Transmittal of the International Search report and the Written Opinion of the International Searching Authority, or the Declaration", International Searching Authority, Sep. 21, 2021, pp. 1-55.

(Continued)

*Primary Examiner* — Ayman A Abaza
*Assistant Examiner* — Alyssa Williams
(74) *Attorney, Agent, or Firm* — Kunzler Bean & Adamson

(57) ABSTRACT

Apparatuses, methods, and systems are disclosed for system information block sizing. One method includes determining whether a first size of a first SIB is greater than a remaining size in a SI message. The system information message includes a second SIB having a second size. The method includes, in response to the first size of the first SIB being greater than the remaining size in the SI message, segmenting the first SIB into multiple segments including a first segment and at least one second segment. A segment size of the first segment is less than or equal to the remaining size in the SI message. The method includes including the first (Continued)

segment of the multiple segments of the first SIB in a third SIB. The system information message includes the second SIB and the third SIB.

20 Claims, 14 Drawing Sheets

(56) References Cited

U.S. PATENT DOCUMENTS

| | | | | |
|---|---|---|---|---|
| 2015/0341978 | A1* | 11/2015 | Rune | H04W 48/12 |
| | | | | 370/254 |
| 2015/0382284 | A1* | 12/2015 | Brismar | H04W 48/12 |
| | | | | 370/329 |
| 2018/0019839 | A1* | 1/2018 | Chen | H04L 1/0038 |
| 2019/0288909 | A1* | 9/2019 | Kadiri | H04L 41/0803 |
| 2019/0306873 | A1* | 10/2019 | Lin | H04W 74/0833 |
| 2021/0058206 | A1* | 2/2021 | Ye | H04L 5/0048 |
| 2021/0211971 | A1* | 7/2021 | Basu Mallick | H04W 48/12 |
| 2021/0337508 | A1* | 10/2021 | Gunnarsson | H04W 48/12 |
| 2023/0142130 | A1* | 5/2023 | Kim | H04B 7/088 |
| | | | | 370/329 |

OTHER PUBLICATIONS

3GPP, "3rd Generation Partnership Project; Technical Specification Group Radio Access Network; Radio Resource Control (RRC); Protocol specification (Release 16)", 3GPP TS 25.331 V16.0.0, Mar. 2020, pp. 1-2319.

3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, pp. 1-1048.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

* cited by examiner

500

```
SIB-Seg-r17 ::=            SEQUENCE {
   sibType-r17                ENUMERATED {sib15, ...},
   segmentType-r17               ENUMERATED {notLastSegment, lastSegment},
   segmentNumber-r17             INTEGER (0..7),
   sibSegment-r17                OCTET STRING,
   lateNonCriticalExtension      OCTET STRING                    OPTIONAL,
   ...
}
```

```
SIB1-Ext-r17 ::=            SEQUENCE {
    cellAccessRelatedInfo-v17xy    CellAccessRelatedInfo-v17xy OPTIONAL,  -- Need R
    si-SchedulingInfo-r17          SI-SchedulingInfo-r17       OPTIONAL,  -- Need R
    lateNonCriticalExtension       OCTET STRING                OPTIONAL,
    nonCriticalExtension           SEQUENCE {}                 OPTIONAL
}
```

```
SIB4-Ext-r17 ::=            SEQUENCE {
    interFreqCarrierFreqList-v17xy    InterFreqCarrierFreqList-v17xy        OPTIONAL,
-- Need R
    lateNonCriticalExtension    OCTET STRING            OPTIONAL,
    ...
}
```

```
SIB1-v17xy-IEs ::=        SEQUENCE {
    pdcch-ConfigSIB1ext-r17     PDCCH-ConfigSIB1ext-r17    OPTIONAL, -- Need R
    nonCriticalExtension        SEQUENCE {}                OPTIONAL
}
```

```
SIB1-Ext-r17 ::=            SEQUENCE {
    cellAccessRelatedInfo-r17    CellAccessRelatedInfo-r17    OPTIONAL, -- Need R
    si-SchedulingInfo-r17        SI-SchedulingInfo-r17        OPTIONAL, -- Need R
    lateNonCriticalExtension     OCTET STRING                 OPTIONAL,
    nonCriticalExtension         SEQUENCE {}                  OPTIONAL
}
```

```
SIB4-Ext-r17 ::=            SEQUENCE {
   interFreqCarrierFreqList-r17    InterFreqCarrierFreqList-r17  OPTIONAL, -- Need R
   lateNonCriticalExtension        OCTET STRING                  OPTIONAL,
   ...
}
```

FIG. 12

SYSTEM INFORMATION BLOCK SIZING

CROSS-REFERENCE TO RELATED APPLICATIONS

This application claims priority to U.S. Patent Application Ser. No. 63/034,757 entitled "APPARATUSES, METHODS, AND SYSTEMS FOR ENHANCED TRANSMISSION OF SYSTEM INFORMATION IN MOBILE RADIO SYSTEMS" and filed on Jun. 4, 2020 for Hyung-Nam Choi, which is incorporated herein by reference in its entirety.

FIELD

The subject matter disclosed herein relates generally to wireless communications and more particularly relates to system information block sizing.

BACKGROUND

In certain wireless communications networks, information for a system information block may not fit into a message as desired. For example, there may be too much information for the size of the message.

BRIEF SUMMARY

Methods for system information block sizing are disclosed. Apparatuses and systems also perform the functions of the methods. One embodiment of a method includes determining whether a first size of a first system information block is greater than a remaining size in a system information message. The system information message includes at least one second system information block having a second size, and a message size of the system information message comprises the second size and the remaining size. In certain embodiments, the method includes, in response to the first size of the first system information block being greater than the remaining size in the system information message, segmenting the first system information block into multiple segments including a first segment and at least one second segment. A segment size of the first segment is less than or equal to the remaining size in the system information message. In some embodiments, the method includes including the first segment of the multiple segments of the first system information block in a third system information block. The system information message includes the at least one second system information block and the third system information block, and excludes the at least one second segment of the multiple segments of the first system information block.

One apparatus for system information block sizing includes a processor that: determines whether a first size of a first system information block is greater than a remaining size in a system information message, wherein the system information message includes at least one second system information block having a second size, and a message size of the system information message includes the second size and the remaining size; in response to the first size of the first system information block being greater than the remaining size in the system information message, segments the first system information block into multiple segments including a first segment and at least one second segment, wherein a segment size of the first segment is less than or equal to the remaining size in the system information message; and includes the first segment of the multiple segments of the first system information block in a third system information block. The system information message includes the at least one second system information block and the third system information block, and excludes the at least one second segment of the multiple segments of the first system information block.

Another embodiment of a method for system information block sizing includes determining whether a size of a system information block is greater than a maximum configured message size of the system information block. In some embodiments, the method includes, in response to the size of the system information block being greater than the maximum configured message size of the system information block, increasing a size of the system information block to an extended block size. In certain embodiments, the method includes transmitting the system information block with the extended block size in a system information message.

Another apparatus for system information block sizing includes a processor that: determines whether a size of a system information block is greater than a maximum configured message size of the system information block; and in response to the size of the system information block being greater than the maximum configured message size of the system information block, increases a size of the system information block to an extended block size. In various embodiments, the apparatus includes a transmitter that transmits the system information block with the extended block size in a system information message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a program code diagram illustrating one embodiment of code for a SIB-Seg;

FIG. 7 is a program code diagram illustrating one embodiment of code for an SIB1 Ext;

FIG. 8 is a program code diagram illustrating one embodiment of code for an SIB4 Ext;

FIG. 9 is a program code diagram illustrating one embodiment of code for SIB1 IEs;

FIG. 11 is a program code diagram illustrating another embodiment of code for an SIB1 Ext;

FIG. 12 is a program code diagram illustrating another embodiment of code for an SIB4 Ext;

DETAILED DESCRIPTION

Figure 1:
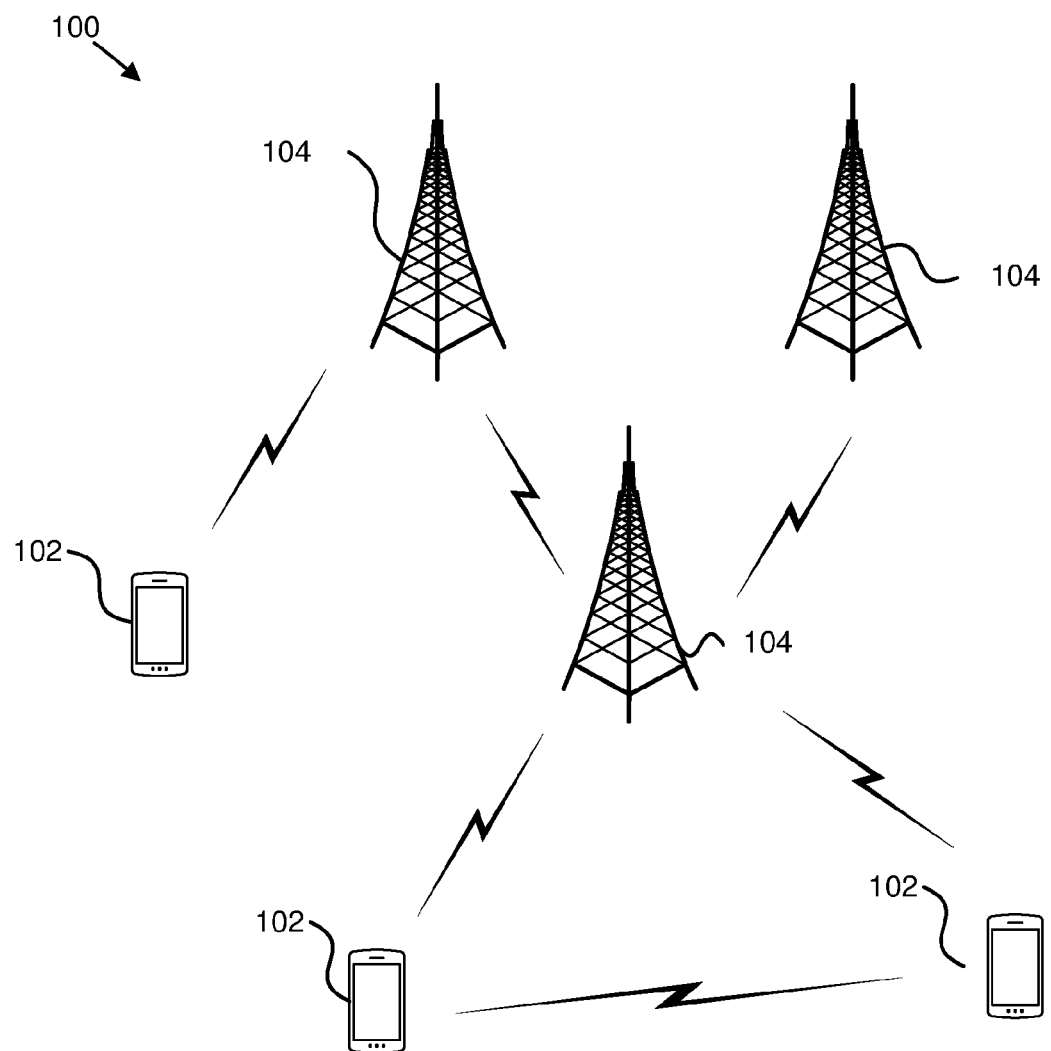
FIG. 1 is a schematic block diagram illustrating one embodiment of a wireless communication system for system information block sizing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Small-talk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for system information block sizing. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE")

802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may determine whether a first size of a first system information block is greater than a remaining size in a system information message. The system information message includes at least one second system information block having a second size, and a message size of the system information message comprises the second size and the remaining size. In certain embodiments, the network unit 104 may, in response to the first size of the first system information block being greater than the remaining size in the system information message, segment the first system information block into multiple segments including a first segment and at least one second segment. A segment size of the first segment is less than or equal to the remaining size in the system information message. In some embodiments, the network unit 104 may include the first segment of the multiple segments of the first system information block in a third system information block. The system information message includes the at least one second system information block and the third system information block, and excludes the at least one second segment of the multiple segments of the first system information block. Accordingly, the network unit 104 may be used for system information block sizing.

In certain embodiments, a network unit 104 may determine whether a size of a system information block is greater than a maximum configured message size of the system information block. In some embodiments, the network unit 104 may, in response to the size of the system information block being greater than the maximum configured message size of the system information block, increase a size of the system information block to an extended block size. In certain embodiments, the network unit 104 may transmit the system information block with the extended block size in a system information message. Accordingly, the network unit 104 may be used for system information block sizing.

Figure 2:
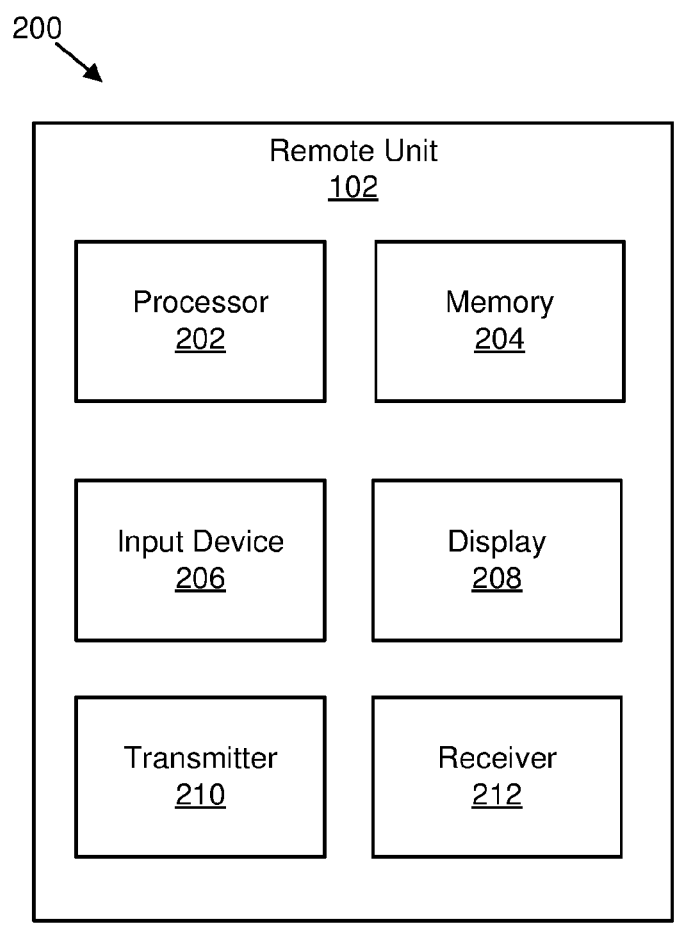
FIG. 2 is a schematic block diagram illustrating one embodiment of an apparatus that may be used for system information block sizing.

FIG. 2 depicts one embodiment of an apparatus 200 that may be used for system information block sizing. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
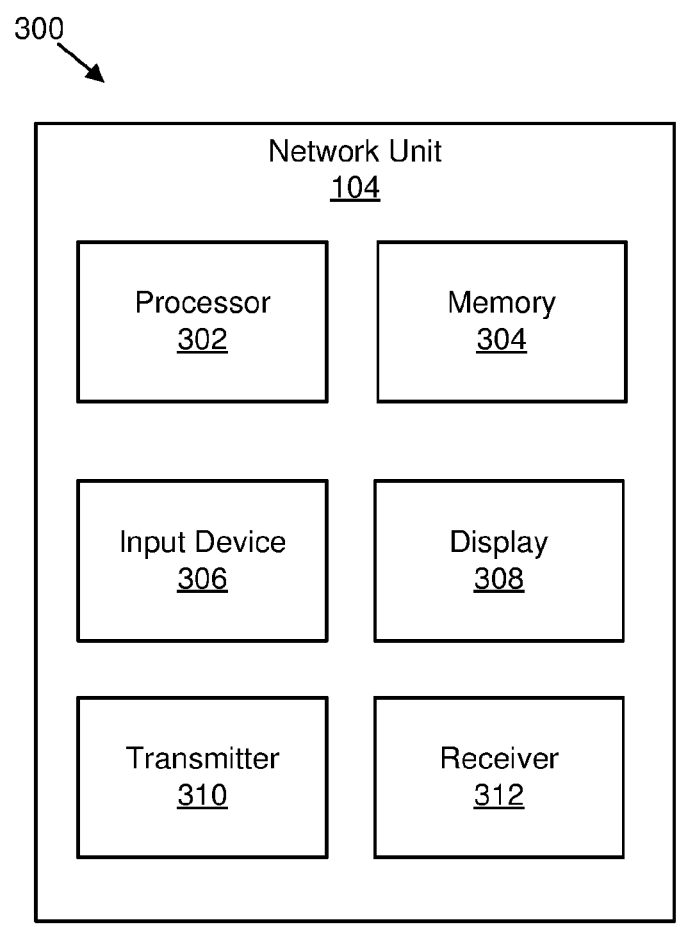
FIG. 3 is a schematic block diagram illustrating one embodiment of an apparatus that may be used for system information block sizing.

FIG. 3 depicts one embodiment of an apparatus 300 that may be used for system information block sizing. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302: determines whether a first size of a first system information block is greater than a remaining size in a system information message, wherein the system information message includes at least one second system information block having a second size, and a message size of the system information message includes the second size and the remaining size; in response to the first size of the first system information block being greater than the remaining size in the system information message, segments the first system information block into multiple segments including a first segment and at least one second segment, wherein a segment size of the first segment is less than or equal to the remaining size in the system information message; and includes the first segment of the multiple segments of the first system information block in a third system information block. The system information message includes the at least one second system information block and the third system information block, and excludes the at least one second segment of the multiple segments of the first system information block.

In some embodiments, the processor 302: determines whether a size of a system information block is greater than a maximum configured message size of the system information block; and in response to the size of the system information block being greater than the maximum configured message size of the system information block, increases a size of the system information block to an extended block size. In various embodiments, the apparatus includes a transmitter that transmits the system information block with the extended block size in a system information message.

In various embodiments, such as new radio ("NR"), evolved universal terrestrial radio access ("E-UTRA") (e.g., long term evolution ("LTE")), and universal terrestrial radio access ("UTRA"), system information ("SI") may be broadcast from a mobile radio cell to all user equipments ("UEs") camped on a concerned cell. With the received SI, a user equipment ("UE") may perform public land mobile network ("PLMN") selection, cell selection and/or reselection, radio resource control ("RRC") connection establishment, and receive public warning messages. In such embodiments, based on a type of information, the SI may be grouped and transmitted on different system information blocks ("SIB").

In certain embodiments, the following SIBs may be defined: 1) MIB which contains cell barred status information and essential physical layer information of a cell required to receive further system information; 2) SIB1 defines scheduling of other system information blocks and contains information required for initial access; 3) SIB2 contains cell reselection information, mainly related to a serving cell; 4) SIB3 contains information about a serving frequency and intra-frequency neighboring cells relevant for cell reselection; 5) SIB4 contains information about other NR frequencies and inter-frequency neighboring cells relevant for cell reselection; 6) SIB5 contains information about E-UTRA frequencies and E-UTRA neighboring cells relevant for cell reselection; 7) SIB6 contains an earthquake and tsunami warning system ("ETWS") primary notification; 8) SIB7 contains an ETWS secondary notification; 9) SIB8 contains a commercial mobile alert service ("CMAS") warning notification; and 10) SIB9 contains information related to global positioning system ("GPS") time and coordinated universal time ("UTC").

Figure 4:
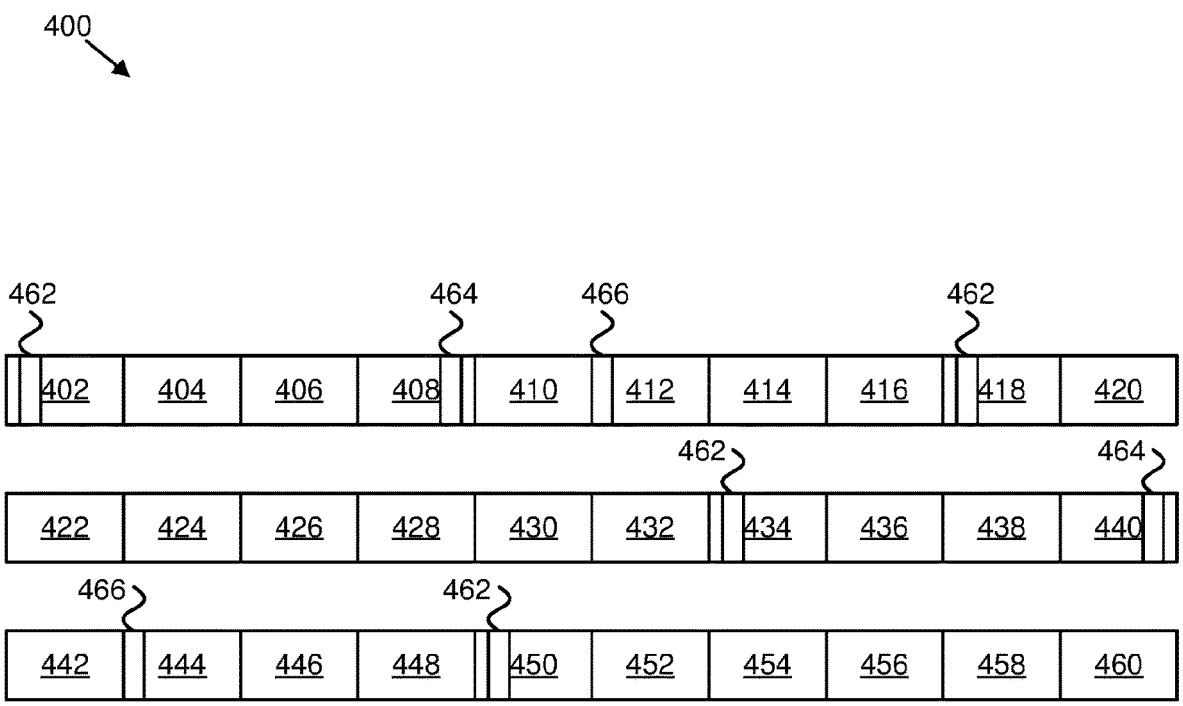
FIG. 4 is a schematic block diagram illustrating one embodiment of system information transmission of a master information block ("MIB"), a SIB1, and one SI message.

In some embodiments, different SIBs are transmitted on different RRC messages and physical channels. In such embodiments, MIB is transmitted on an MIB message and a physical broadcast channel ("PBCH"), SIB1 is transmitted on a SIB1 message and a physical downlink shared channel ("PDSCH"), and all other SIBs are transmitted on an SI message and the PDSCH. Furthermore, an SI message may contain one or multiple SIBs if an SI message size allows and if all SIBs mapped to the same SI message have the same periodicity. In Table 1, one embodiment of characteristics of system information transmission for NR SIBs are summarized. Moreover, FIG. 4 illustrates one embodiment of system information transmission of MIB, SIB1 and one SI message (e.g., with 160 ms periodicity and carrying SIB2, SIB3, and SIB4). It should be noted that only the transmission in time-domain and radio frame level are illustrated and without repetitions.

TABLE 1

Characteristics of System Information Transmission for NR SIBs

| System information | Schedule | Other |
|---|---|---|
| MIB | periodicity of 80 ms and repetitions made within 80 ms | Broadcast only<br>Repetitions are scheduled according to a period of a synchronization signal block ("SSB") |
| SIB1 | periodicity of 160 ms and variable transmission repetition periodicity within 160 ms | Broadcast or dedicated by using an RRC reconfiguration message<br>Cell-specific SIB |
| SIB2, . . . , SIB9 | Variable periodicity of {80, 160, 320, 640, 1280, 2560, 5120} ms | Broadcast or dedicated by using an RRC reconfiguration message (e.g., only for SIB6, SIB7, and SIB8)<br>Only SIBs having the same periodicity may be mapped to the same SI message<br>Each SI message is associated with an SI-window and the SI-windows of different SI messages do not overlap<br>An SI message may be transmitted a number of times within the SI-window |

TABLE 1-continued

Characteristics of System Information Transmission for NR SIBs

| System information | Schedule | Other |
|---|---|---|
| | | May be configured to be cell specific or may be SI area specific (e.g., one or several cells identified by a system information area identifier ("ID")) |

FIG. 4 is a schematic block diagram 400 illustrating one embodiment of system information transmission of an MIB, a SIB1, and one SI message. The block diagram 400 illustrates a radio frame i 402, a radio frame i+1 404, a radio frame i+2 406, a radio frame i+3 408, a radio frame i+4 410, a radio frame i+5 412, a radio frame i+6 414, a radio frame i+7 416, a radio frame i+8 418, a radio frame i+9 420, a radio frame i+10 422, a radio frame i+11 424, a radio frame i+12 426, a radio frame i+13 428, a radio frame i+14 430, a radio frame i+15 432, a radio frame i+16 434, a radio frame i+17 436, a radio frame i+18 438, a radio frame i+19 440, a radio frame i+20 442, a radio frame i+21 444, a radio frame i+22 446, a radio frame i+23 448, a radio frame i+24 450, a radio frame i+25 452, a radio frame i+26 454, a radio frame i+27 456, a radio frame i+28 458, a radio frame i+29 460. MIB messages 462, SIB1 messages 464, and SI messages 466 are illustrated as part of the block diagram 400.

In various configurations, there may be physical layer limitations on a message size for SIB1 and SI: 1) a maximum SIB1 or SI message size may be limited to 2976 bits; and/or 2) a maximum SIB1 or SI message size may be limited to 1736 bits (e.g., for downlink configuration information ("DCI") format 1C) and 2216 bits (e.g., for DCI format 1A).

In certain embodiments, due to message size limitations, segmentation may be used for SIB7 (e.g., ETWS secondary notification) and SIB8 (e.g., CMAS warning notification) as their size may exceed a maximum SI message size due to a varying size of the warning message (e.g., may vary between 1 to 9600 bytes). In some embodiments, segmentation for a SIB12 (e.g., containing information related to NR sidelink communication) may be used as its maximum size may be 17360 bits.

In various embodiments, a size of SIBs may increase due to further extensions and/or further new SIBs may be introduced (e.g., as a result of new solutions to enhance transmission of system information).

In some embodiments: 1) SIBs which may be close to or exceeding a maximum message size due to extensions may be transmitted in an efficient and backwards-compatibility manner; and/or 2) capacity for system information transmission may be used in a resource-efficient manner.

In various embodiments, a new SIB may be used for carrying an SIB segment from another SIB.

In certain embodiments, a new SIB (e.g., called SIB-Seg) may be used to carry a SIB segment from another SIB and may have the following structure: 1) a field SIB type (e.g., sibType) may be used to indicate a segmented SIB type; 2) a field segmentation type (e.g., segmentType) may be used to indicate whether an included SIB segment is a last segment; 3) a field segment number (e.g., segmentNumber) may be used to indicate a segment number of an SIB segment contained in the new SIB—a segment number of zero may correspond to a first segment, a segment number of one may correspond to the second segment, and so forth; and/or 4) a field SIB segment (e.g., sibSegment) may be used to carry a SIB segment.

In some embodiments, a new SIB may be of variable length and may use spare capacity of an SI message (e.g., a network determines a size of the new SIB and a contained SIB segment based on an available spare capacity of the SI message).

In various embodiments, a new SIB carries only one segment at a time and each segment is not self-decodable, and thus a UE may reassemble all received SIB segments prior to decoding.

In certain embodiments, a new SIB is only mapped with other SIBs in the same SI message if the other SIBs have the same periodicity as a segmented SIB. In some embodiments, a new SIB may be mapped with other SIBs in the same SI message that presents an earliest opportunity for transmission of the new SIB.

In various embodiments, a presence and scheduling of a new SIB in a cell may be indicated by a legacy SIB1.

In certain embodiments, since a segmented SIBs may be relevant only for some types of UEs, a network may decide to provide them to UEs only upon request by UEs using an on-demand request functionality. With this the network may control access of those UEs to a cell.

In some embodiments, legacy UEs (e.g., UEs of release 16 ("Rel-16") and earlier) acquire only legacy SIBs from a received SI message. Moreover, in such embodiments, non-legacy UEs (e.g., release 17 ("Rel-17") and later UEs) may acquire both legacy SIBs and a new SIB from a received SI message, and the non-legacy UEs may reassemble SIB segments encapsulated therein.

As may be appreciated, one or more embodiments described herein may be combined together. It should be noted that one advantage of various embodiments described herein may be that a capacity of an SI message may be used more efficiently. Furthermore, a separate SI message (e.g., and thus associated physical resources) for transmitting a non-segmented version of an SIB may be saved.

In various embodiments, extended versions of SIBs may be used.

In certain embodiments, new SIBs (e.g., called SIB-Ext) may be used to extend a capacity of existing SIBs to avoid segmentation of those SIBs if they exceed a maximum SI message size limit. As may be appreciated, a drawback of segmentation may be that there may be additional latency for receiving a complete SIB.

In some embodiments, each extended SIB carries information that is self-decodable and corresponds to information carried on its originated SIB. For example, SIB1-Ext may be used to carry extensions from Rel-17 and later of legacy SIB1. In another example, SIB1-Ext may be used to carry a complete set of certain parameters containing legacy parameters and extended parameters. In a further example, SIB16 may carry static information that is broadcast less frequently and SIB16-Ext may be used to carry dynamic information that is broadcast more frequently. In an additional example, SIB17 may carry service-related information that is relevant for UEs of a home public land mobile network ("HPLMN") and SIB17-Ext may be used to carry service-related information that is relevant for UEs of a visiting public land mobile network ("VPLMN").

In various embodiments, each extended SIB is of variable length and carries information from any further 3GPP release until it reaches a maximum SI message size limit.

In certain embodiments, since extended SIBs may be relevant only for some types of UEs, a network may decide to provide them to UEs only upon request by UEs using an on-demand request functionality With this the network may control access of those UEs to the cell.

In some embodiments, a presence and scheduling of extended versions of SIBs in a cell is indicated by a legacy SIB1. Moreover, various embodiments may include that: 1) a presence and scheduling of extended versions of SIBs in a cell may be pre-defined (e.g., on pre-defined physical resources in time and frequency); 2) extended versions of SIBs may be provided in conjunction with on-boarding mechanisms (e.g., mechanisms that enable a UE to access a desired network or service); and/or 3) scheduling of extended versions of SIBs may be made using separate SI scheduling information.

In certain embodiments, an extended SIB may be broadcast in the same SI-window as an existing SIB. This may be signaled by a network to a UE through a physical layer control channel (e.g., physical downlink control channel ("PDCCH")) that indicates a corresponding hybrid automatic repeat request ("HARQ") process for the reception of the system information messages using the same SI-window.

In some embodiments, legacy UEs (e.g., UEs of Rel-16 and earlier) acquire legacy SIBs according to legacy signaling. In such embodiments, non-legacy UEs (e.g., Rel-17 and later UEs) acquire both the legacy SIBs and extended SIBs according to new signaling.

As may be appreciated, one advantage of embodiments described herein are that they may enable transmitting system information without a need of SIB segmentation, in accordance with characteristics of the concerned information, and/or upon request by a UE.

It should be noted that, while various embodiments described herein focus on NR connected to a fifth generation core network ("5GC"), they also may be applicable to LTE connected to an evolved packet core ("EPC") and/or 5GC.

In various embodiments, a new SIB may be used for carrying an SIB segment from another SIB. In such embodiments, the following assumptions may be made: 1) there may be a new SIB segment (e.g., Rel-17 SIB-Seg) for carrying a SIB segment from another SIB used in a radio cell—one embodiment of an ASN.1 structure of the new SIB segment is shown in FIG. 5 (e.g., FIG. 5 is a program code diagram 500 illustrating one embodiment of code for a SIB-Seg) in which: field sibType-r17 indicates a segmented SIB type SIB15, field segmentType-r17 indicates whether the included SIB segment is the last segment, field segmentNumber-r17 indicates a segment number of the SIB segment contained in SIB-Seg—a segment number of zero corresponds to the first segment, a segment number of one corresponds to the second segment, and so forth, and field sibSegment-r17 carries a SIB segment; 2) Rel-17 SIB15 is of size 500 bits and is broadcast as segmented SIB; 3) besides MIB and SIB1, two SI messages (e.g., SI-1, SI-2) are broadcast in a cell—SI-1 carries SIB2, SIB3 and SIB4, and SI-2 carries SIB5 and SIB11—the following spare capacity in the SI-1 and SI-2 messages are assumed: 300 bits in SI-1 and 200 bits in SI-2—therefore, the network segments SIB15 in 2 segments accordingly (e.g. first segment of 300 bits and second segment of 200 bits), where each segment is encapsulated in the new SIB-Seg—that means the first segment of SIB15 is encapsulated in SIB-Seg and sent on SI-1 message, whereas the second segment of SIB15 is encapsulated in SIB-Seg and sent on SI-2 message; and 4) the network broadcasts the following scheduling information of the SI messages SI-1 and SI-2 in SIB1: SI-1—si-Periodicity of 160 ms and sib-MappingInfo of {SIB2, SIB3, SIB4, SIB-Seg}, and SI-2—si-Periodicity of 160 ms and sib-MappingInfo of {SIB5, SIB11, SIB-Seg}.

Figure 6:
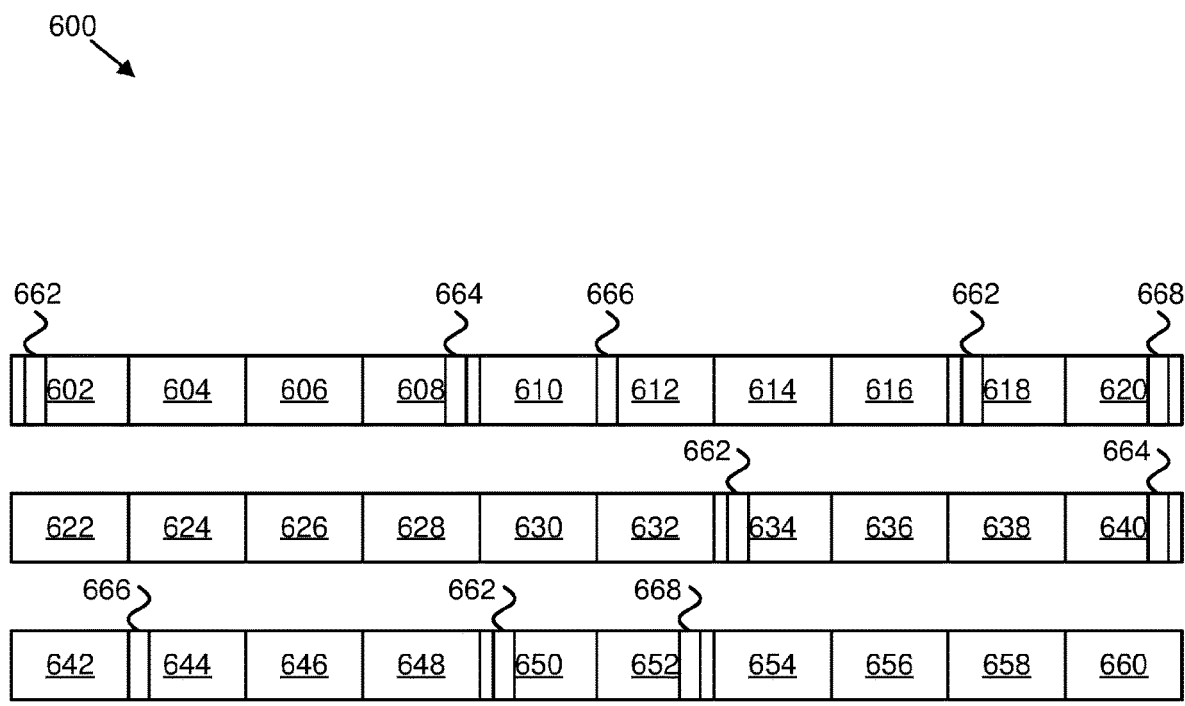
FIG. 6 is a schematic block diagram illustrating one embodiment of transmission of an MIB, an SIB1, a SI-1 message, and a SI-2 message.

FIG. 6 is a schematic block diagram 600 illustrating one embodiment of transmission of an MIB, an SIB1, a SI-1 message, and a SI-2 message. The block diagram 600 illustrates a radio frame i 602, a radio frame i+1 604, a radio frame i+2 606, a radio frame i+3 608, a radio frame i+4 610, a radio frame i+5 612, a radio frame i+6 614, a radio frame i+7 616, a radio frame i+8 618, a radio frame i+9 620, a radio frame i+10 622, a radio frame i+11 624, a radio frame i+12 626, a radio frame i+13 628, a radio frame i+14 630, a radio frame i+15 632, a radio frame i+16 634, a radio frame i+17 636, a radio frame i+18 638, a radio frame i+19 640, a radio frame i+20 642, a radio frame i+21 644, a radio frame i+22 646, a radio frame i+23 648, a radio frame i+24 650, a radio frame i+25 652, a radio frame i+26 654, a radio frame i+27 656, a radio frame i+28 658, a radio frame i+29 660. MIB messages 662, SIB1 messages 664, SI-1 messages 666, and SI-2 messages 668 are illustrated as part of the block diagram 600.

In FIG. 6, legacy UEs (e.g., UEs of Rel-16 and earlier) acquire only the legacy SIBs (e.g., MIB, SIB1, SIB2, SIB3, SIB4, SIB5 and SIB11) from the received SI messages, and non-legacy UEs (e.g., Rel-17 and later UEs) acquire both the legacy SIBs and the new SIB-Seg from the received SI messages, and reassemble SIB15 according to the encapsulated segments in SIB-Seg.

In certain embodiments, a device may broadcast extended versions of SIBs carrying extensions (e.g., Rel-17 extensions) of existing SIBs. In such embodiments, the following assumptions may be made: 1) extended versions of SIB1 and SIB4 are broadcast in a radio cell (e.g., SIB1-Ext and SIB4-Ext); 2) a new SIB1-Ext-r17 carries the extended field cellAccessRelatedInfo-v17xy of a legacy field cellAccessRelatedInfo that is broadcast in legacy SIB1—the extended field cellAccessRelatedInfo-v17xy may be used to signal additional cell access related information for further PLMNs—furthermore, SIB1-Ext-r17 contains scheduling information si-SchedulingInfo-r17 for SIB4-Ext-r17—FIG. 7 is a program code diagram 700 illustrating one embodiment of code for an SIB1 Ext; 3) new SIB4ext-r17 carries the extended list interFreqCarrierFreqList-v17xy of the legacy interFreqCarrierFreqList that is broadcast in legacy SIB4—the extended list interFreqCarrierFreqList-v17xy may be used to signal additional inter-frequency neighbouring cell information for up to 32 inter-frequencies—it may be assumed that SIB4-Ext is sent on an SI message with a periodicity of 160 ms—FIG. 8 is a program code diagram 800 illustrating one embodiment of code for an SIB4 Ext; and/or 4) legacy SIB1 has been extended by new field pdcch-ConfigSIBlext-r17 to indicate that extended SIBs are broadcast in the cell and to indicate to Rel-17 UEs all the parameters needed to decode the SIB1-Ext information in time and frequency—it may be assumed that SIB1-Ext is sent with a pre-defined periodicity of 160 ms like legacy SIB1—FIG. 9 is a program code diagram 900 illustrating one embodiment of code for SIB1 IEs.

Figure 10:
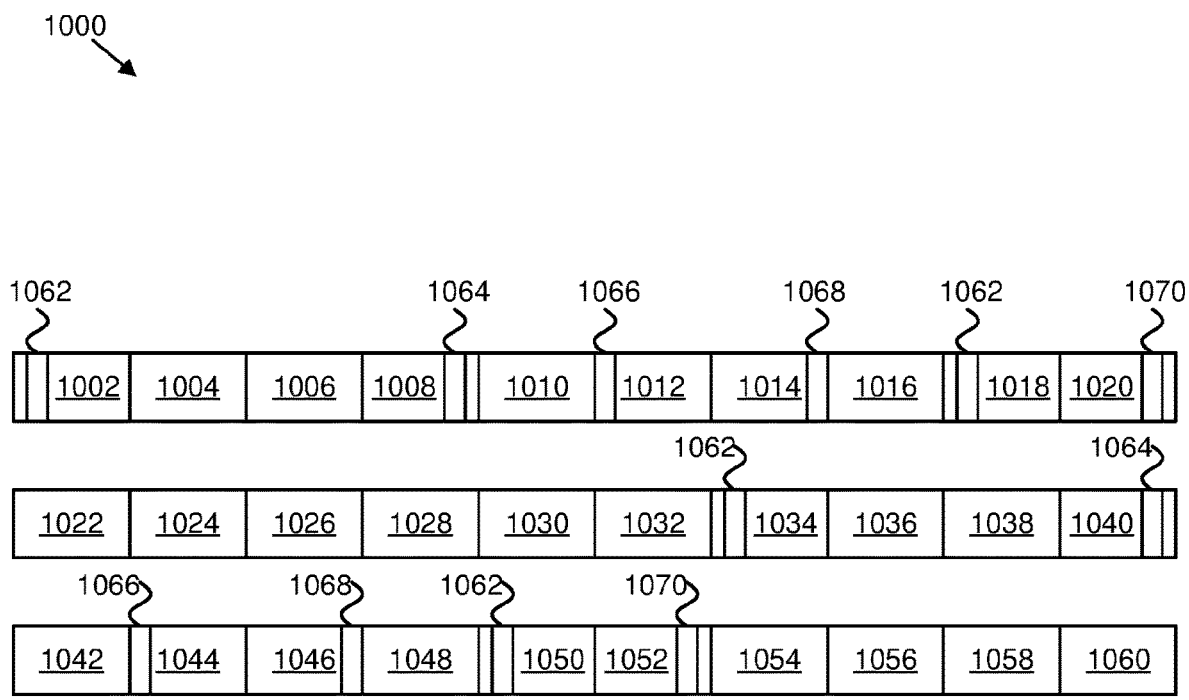
FIG. 10 is a schematic block diagram illustrating one embodiment of transmission of a MIB, a SIB1, an SI-1 message (e.g., carrying SIB2, SIB3 and SIB4), an SIB1-Ext, and an SI-2 message (e.g., carrying SIB4-Ext)

FIG. 10 is a schematic block diagram 1000 illustrating one embodiment of transmission of a MIB, a SIB1, an SI-1 message (e.g., carrying SIB2, SIB3 and SIB4), an SIB1-Ext, and an SI-2 message (e.g., carrying SIB4-Ext). The block diagram 1000 illustrates a radio frame i 1002, a radio frame i+1 1004, a radio frame i+2 1006, a radio frame i+3 1008, a radio frame i+4 1010, a radio frame i+5 1012, a radio frame i+6 1014, a radio frame i+7 1016, a radio frame i+8 1018, a radio frame i+9 1020, a radio frame i+10 1022, a radio frame i+11 1024, a radio frame i+12 1026, a radio frame i+13 1028, a radio frame i+14 1030, a radio frame i+15 1032, a radio frame i+16 1034, a radio frame i+17 1036, a radio frame i+18 1038, a radio frame i+19 1040, a radio frame i+20 1042, a radio frame i+21 1044, a radio frame i+22 1046, a radio frame i+23 1048, a radio frame i+24 1050, a radio frame i+25 1052, a radio frame i+26 1054, a radio frame i+27 1056, a radio frame i+28 1058, a radio frame i+29 1060. MIB messages 1062, SIB1 messages 1064, SI-1 messages 1066, SIB1-Ext message 1068, and SI-2 messages 1070 are illustrated as part of the block diagram 1000.

In FIG. 10, legacy UEs (e.g., UEs of Rel-16 and earlier) acquire the legacy SIBs (e.g., MIB, SIB1, SIB2, SIB3, and SIB4) according to legacy signaling. Non-legacy UEs (e.g., Rel-17 and later UEs) acquire both the legacy SIBs and extended SIBs according to new broadcast signaling.

In some embodiments, a device may broadcast extended versions of SIBs carrying a complete set of parameters of existing SIBs. In such embodiments, any of the assumptions of other embodiments may be used, but with the following exceptions: 1) new SIB1-Ext-r17 carries a Rel-17 version of cellAccessRelatedInfo that contains both of a) all the parameters defined in legacy field cellAccessRelatedInfo and 2) all the extended parameters in Rel-17—FIG. 11 is a program code diagram 1100 illustrating another embodiment of code for an SIB1 Ext; and/or 2) new SIB4-Ext-r17 carries the Rel-17 version of interFreqCarrierFreqList-r17 that contains both of a) all the parameters defined in legacy interFreqCarrierFreqList and b) all the extended parameters in Rel-17—FIG. 12 is a program code diagram 1200 illustrating another embodiment of code for an SIB4 Ext.

In various embodiments, transmission of MIB, SIB1, a SI-1 message (carrying SIB2, SIB3 and SIB4), a SIB1-Ext, and a SI-2 message (e.g., carrying SIB4-Ext) is similar to the transmission described in relation to FIG. 10. In such embodiments, legacy UEs (e.g., UEs of Rel-16 and earlier) acquire the legacy SIBs (e.g., MIB, SIB1, SIB2, SIB3, and SIB4) according to legacy signaling. Non-legacy UEs (e.g., Rel-17 and later UEs) acquire both the legacy SIBs and extended SIBs according to the new broadcast signaling. With regards to the parameters related to cellAccessRelatedInfo and interFreqCarrierFreqList, these UEs only consider the ones acquired from SIB1-Ext and SIB4-Ext.

In some embodiments, a device may broadcast an extended version of a SIB in the same SI-window as an existing SIB. In such embodiments, any of the assumptions of other embodiments may be used, but with the following exception: the new SIB1-Ext may be transmitted in the same SI-window as the legacy SIB1. By transmitting both SIB1 messages in the same SI-window, the acquisition time may be reduced for the UE and/or a capacity of system information messages may be increased. In various embodiments, a UE uses only one dedicated broadcast HARQ process for the reception of SI since SI-windows may not overlap and there may be only one message within an SI-window.

In certain embodiments, to support the transmission of SIB1 and SIB1-Ext within the same SI-window, a UE may be assumed to support more than one HARQ process (e.g., two HARQ processes) for the reception of SI. In such embodiments, PDCCH addressed by an SI radio network temporary identifier ("SI-RNTI") may indicate a corresponding HARQ process for the system information message (e.g., SIB1, SIB1-Ext).

Figure 13:
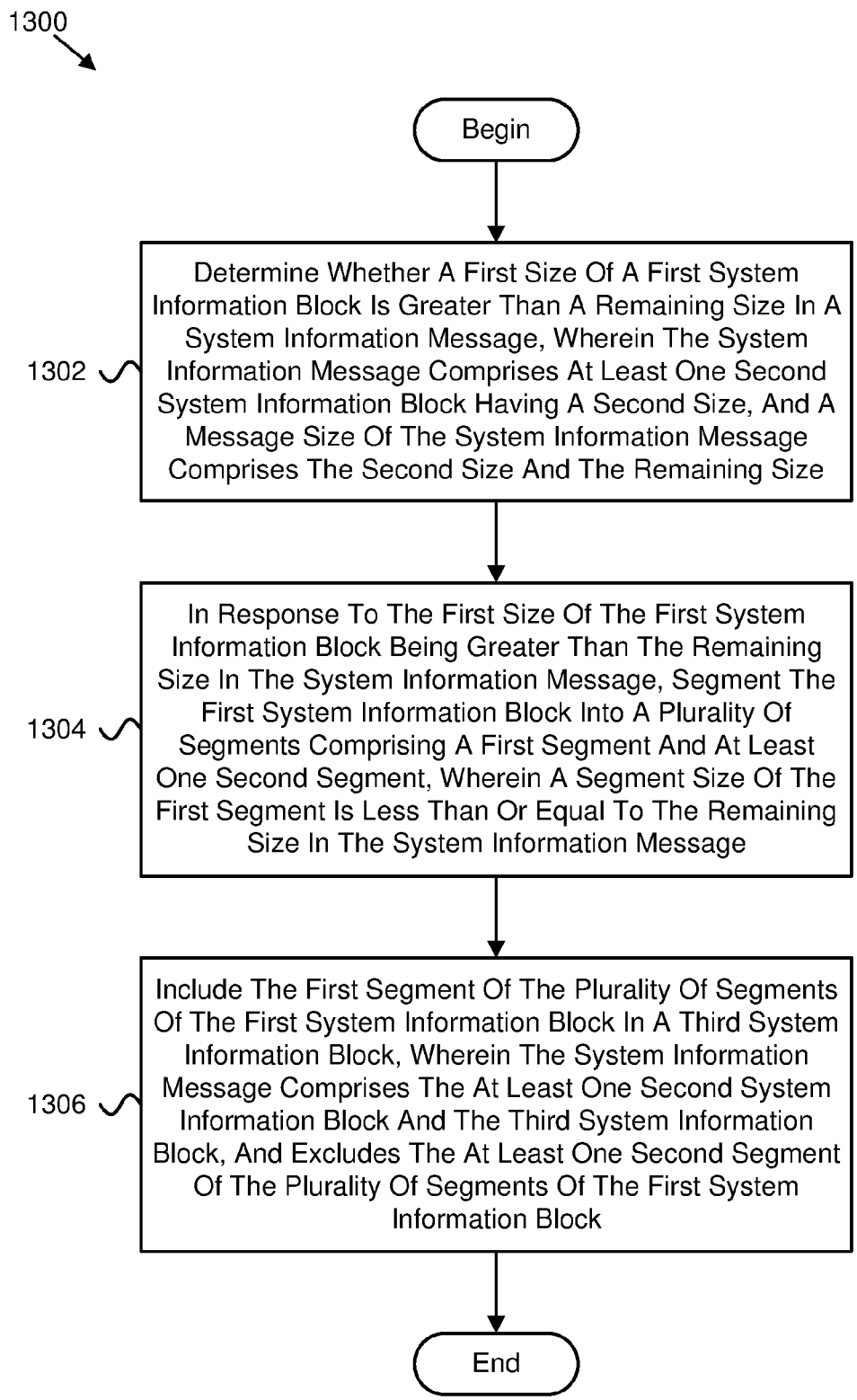
FIG. 13 is a flow chart diagram illustrating one embodiment of a method for system information block sizing.

FIG. 13 is a flow chart diagram illustrating one embodiment of a method 1300 for system information block sizing. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes determining 1302 whether a first size of a first system information block is greater than a remaining size in a system information message. The system information message includes at least one second system information block having a second size, and a message size of the system information message comprises the second size and the remaining size. In certain embodiments, the method 1300 includes, in response to the first size of the first system information block being greater than the remaining size in the system information message, segmenting 1304 the first system information block into multiple segments including a first segment and at least one second segment. A segment size of the first segment is less than or equal to the remaining size in the system information message. In some embodiments, the method 1300 includes including 1306 the first segment of the multiple segments of the first system information block in a third system information block. The system information message includes the at least one second system information block and the third system information block, and excludes the at least one second segment of the multiple segments of the first system information block.

In certain embodiments, the method 1300 further comprises transmitting the system information message. In some embodiments, the third system information block comprises a system information block type field that indicates a system information block type. In various embodiments, the third system information block comprises a segment type field that indicates whether the first segment is a last segment.

In one embodiment, the third system information block comprises a segment number field that indicates a number corresponding to the first segment. In certain embodiments, the third system information block comprises a system information block segment field that carries system information block data of the first segment. In some embodiments, a size of the third system information block is variable.

In various embodiments, the third system information block is not self-decodable. In one embodiment, the at least one second system information block and the third system information block have the same periodicity. In certain embodiments, the method 1300 further comprises indicating scheduling of the third system information block via scheduling information for the system information message. In some embodiments, the method 1300 further comprises transmitting the third system information block only in response to an on-demand request by a communication device.

Figure 14:
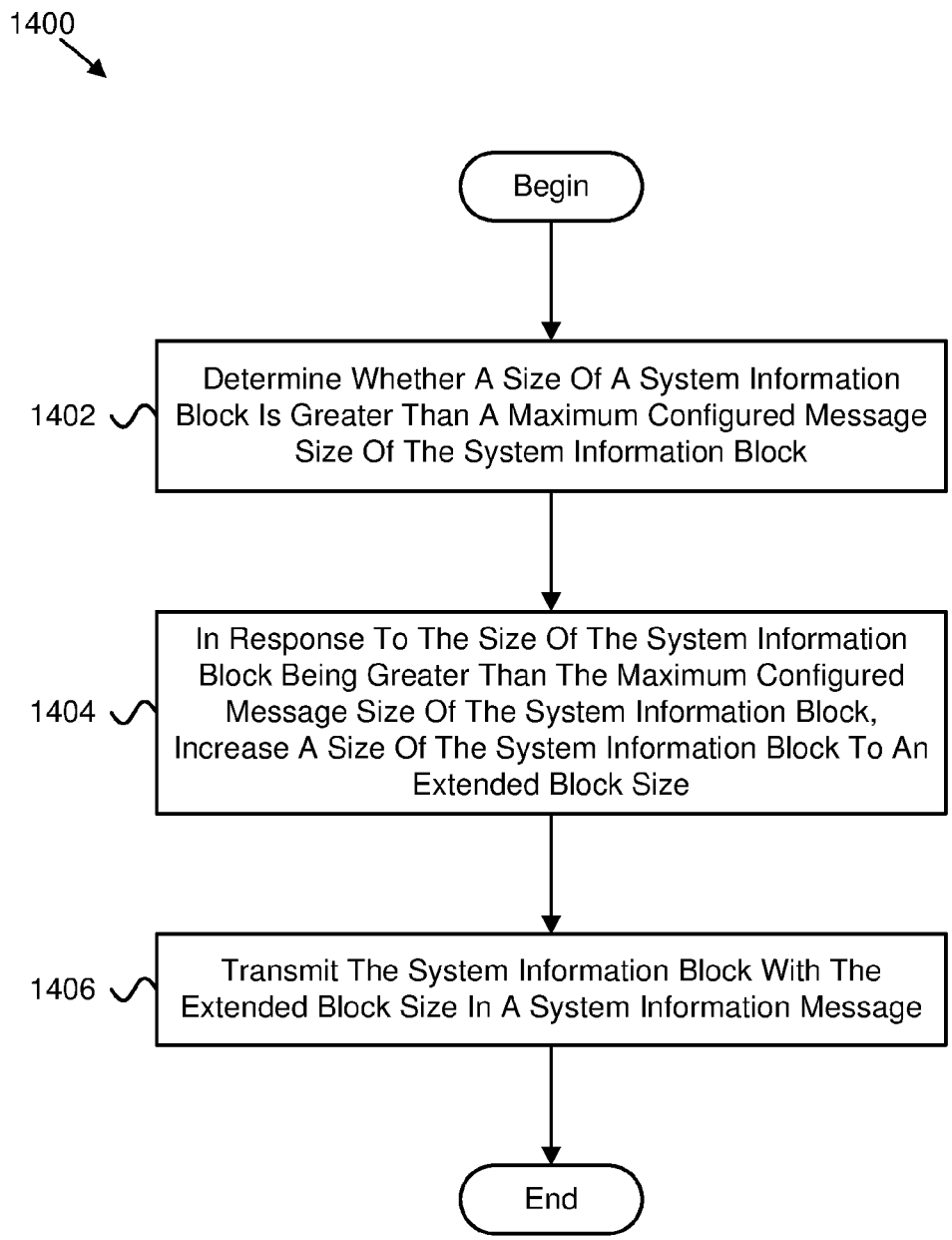
FIG. 14 is a flow chart diagram illustrating another embodiment of a method for system information block sizing.

FIG. 14 is a flow chart diagram illustrating one embodiment of a method 1400 for system information block sizing. In some embodiments, the method 1400 is performed by an apparatus, such as the network unit 104. In certain embodiments, the method 1400 may be performed by a processor executing program code, for example, a microcontroller, a microprocessor, a CPU, a GPU, an auxiliary processing unit, a FPGA, or the like.

In various embodiments, the method 1400 includes determining 1402 whether a size of a system information block is greater than a maximum configured message size of the system information block. In some embodiments, the method 1400 includes, in response to the size of the system information block being greater than the maximum configured message size of the system information block, increasing 1404 a size of the system information block to an extended block size. In certain embodiments, the method 1400 includes transmitting 1406 the system information block with the extended block size in a system information message.

In certain embodiments, the extended block size is variable. In some embodiments, the system information block with the extended block size is self-decodable. In various embodiments, the system information block with the extended message size carries parameters of the system information block that exceeds the maximum configured message size of the system information block.

In one embodiment, the system information block with the extended message size and an associated system information block are transmitted in the same system information window. In certain embodiments, the method 1400 further comprises indicating scheduling of the system information block with the extended block size via scheduling information for a system information message. In some embodiments, the method 1400 further comprises transmitting the system information block with the extended block size only in response to an on-demand request by a communication device.

In various embodiments, the system information block with the extended block size carries dynamic information that is broadcast at a greater frequency than the system information block without the extended block size. In one embodiment, the system information block with the extended block size carries service-related information relevant to communication devices of a visiting public land mobile network and the system information block without the extended block size carries service-related information relevant to communication devices of a home public land mobile network.

In one embodiment, a method comprises: determining whether a first size of a first system information block is greater than a remaining size in a system information message, wherein the system information message comprises at least one second system information block having a second size, and a message size of the system information message comprises the second size and the remaining size; in response to the first size of the first system information block being greater than the remaining size in the system information message, segmenting the first system information block into a plurality of segments comprising a first segment and at least one second segment, wherein a segment size of the first segment is less than or equal to the remaining size in the system information message; and including the first segment of the plurality of segments of the first system information block in a third system information block, wherein the system information message comprises the at least one second system information block and the third system information block, and excludes the at least one second segment of the plurality of segments of the first system information block.

In certain embodiments, the method further comprises transmitting the system information message.

In some embodiments, the third system information block comprises a system information block type field that indicates a system information block type.

In various embodiments, the third system information block comprises a segment type field that indicates whether the first segment is a last segment.

In one embodiment, the third system information block comprises a segment number field that indicates a number corresponding to the first segment.

In certain embodiments, the third system information block comprises a system information block segment field that carries system information block data of the first segment.

In some embodiments, a size of the third system information block is variable.

In various embodiments, the third system information block is not self-decodable.

In one embodiment, the at least one second system information block and the third system information block have the same periodicity.

In certain embodiments, the method further comprises indicating scheduling of the third system information block via scheduling information for the system information message.

In some embodiments, the method further comprises transmitting the third system information block only in response to an on-demand request by a communication device.

In one embodiment, an apparatus comprises: a processor that: determines whether a first size of a first system information block is greater than a remaining size in a system information message, wherein the system information message comprises at least one second system information block having a second size, and a message size of the system information message comprises the second size and the remaining size; in response to the first size of the first system information block being greater than the remaining size in the system information message, segments the first system information block into a plurality of segments comprising a first segment and at least one second segment, wherein a segment size of the first segment is less than or equal to the remaining size in the system information message; and includes the first segment of the plurality of segments of the first system information block in a third system information block, wherein the system information message comprises the at least one second system information block and the third system information block, and excludes the at least one second segment of the plurality of segments of the first system information block.

In certain embodiments, the apparatus further comprises a transmitter that transmits the system information message.

In some embodiments, the third system information block comprises a system information block type field that indicates a system information block type.

In various embodiments, the third system information block comprises a segment type field that indicates whether the first segment is a last segment.

In one embodiment, the third system information block comprises a segment number field that indicates a number corresponding to the first segment.

In certain embodiments, the third system information block comprises a system information block segment field that carries system information block data of the first segment.

In some embodiments, a size of the third system information block is variable.

In various embodiments, the third system information block is not self-decodable.

In one embodiment, the at least one second system information block and the third system information block have the same periodicity.

In certain embodiments, the processor indicates scheduling of the third system information block via scheduling information for the system information message.

In some embodiments, the apparatus further comprises a transmitter that transmits the third system information block only in response to an on-demand request by a communication device.

In one embodiment, a method comprises: determining whether a size of a system information block is greater than a maximum configured message size of the system information block; in response to the size of the system information block being greater than the maximum configured message size of the system information block, increasing a size of the system information block to an extended block size; and transmitting the system information block with the extended block size in a system information message.

In certain embodiments, the extended block size is variable.

In some embodiments, the system information block with the extended block size is self-decodable.

In various embodiments, the system information block with the extended message size carries parameters of the system information block that exceeds the maximum configured message size of the system information block.

In one embodiment, the system information block with the extended message size and an associated system information block are transmitted in the same system information window.

In certain embodiments, the method further comprises indicating scheduling of the system information block with the extended block size via scheduling information for a system information message.

In some embodiments, the method further comprises transmitting the system information block with the extended block size only in response to an on-demand request by a communication device.

In various embodiments, the system information block with the extended block size carries dynamic information that is broadcast at a greater frequency than the system information block without the extended block size.

In one embodiment, the system information block with the extended block size carries service-related information relevant to communication devices of a visiting public land mobile network and the system information block without the extended block size carries service-related information relevant to communication devices of a home public land mobile network.

In one embodiment, an apparatus comprises: a processor that: determines whether a size of a system information block is greater than a maximum configured message size of the system information block; and in response to the size of the system information block being greater than the maximum configured message size of the system information block, increases a size of the system information block to an extended block size; and a transmitter that transmits the system information block with the extended block size in a system information message.

In certain embodiments, the extended block size is variable.

In some embodiments, the system information block with the extended block size is self-decodable.

In various embodiments, the system information block with the extended message size carries parameters of the system information block that exceeds the maximum configured message size of the system information block.

In one embodiment, the system information block with the extended message size and an associated system information block are transmitted in the same system information window.

In certain embodiments, the processor indicates scheduling of the system information block with the extended block size via scheduling information for a system information message.

In some embodiments, the transmitter transmits the system information block with the extended block size only in response to an on-demand request by a communication device.

In various embodiments, the system information block with the extended block size carries dynamic information that is broadcast at a greater frequency than the system information block without the extended block size.

In one embodiment, the system information block with the extended block size carries service-related information relevant to communication devices of a visiting public land mobile network and the system information block without the extended block size carries service-related information relevant to communication devices of a home public land mobile network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
   determining whether a physical layer size of a system information block (SIB) is greater than a maximum configured physical layer message size of the SIB;
   in response to the physical layer size of the SIB being greater than the maximum configured physical layer message size of the SIB, increasing a size of the SIB to an extended block size; and
   transmitting the SIB with the extended block size in a system information (SI) message to at least one user equipment (UE).

2. The method of claim 1, wherein the extended block size is variable.

3. The method of claim 1, wherein the SIB with the extended block size is self-decodable.

4. The method of claim 1, wherein the SIB with the extended block size carries parameters of the SIB that exceeds the maximum configured message size of the SIB.

5. The method of claim 1, wherein the SIB with the extended block size and an associated SIB are transmitted in a same SI window.

6. The method of claim 1, further comprising indicating scheduling of the SIB with the extended block size via scheduling information for the SI message.

7. The method of claim 1, further comprising transmitting the SIB with the extended block size only in response to an on-demand request by a user equipment (UE).

8. The method of claim 1, wherein the SIB with the extended block size carries dynamic information that is broadcast at a greater frequency than the SIB without the extended block size.

9. The method of claim 1, wherein the SIB with the extended block size carries service-related information relevant to user equipments (UEs) of a visiting public land mobile network (VPLMN) and the SIB without the extended block size carries service-related information relevant to UEs of a home public land mobile network (HPLMN).

10. A base station, comprising:
   at least one memory; and
   at least one processor coupled with the at least one memory and configured to cause the base station to:
      determine whether a physical layer size of a system information block (SIB) is greater than a maximum configured physical layer message size of the SIB;
      in response to the physical layer size of the SIB being greater than the maximum configured physical layer message size of the SIB, increase a size of the SIB to an extended block size; and
      transmit the SIB with the extended block size in a system information message to at least one user equipment (UE).

11. The base station of claim 10, wherein the extended block size is variable.

12. The base station of claim 10, wherein the SIB with the extended block size is self-decodable.

13. The base station of claim 10, wherein the SIB with the extended block size carries parameters of the SIB that exceeds the maximum configured message size of the SIB.

14. The base station of claim 10, wherein the SIB with the extended block size and an associated SIB are transmitted in a same system information (SI) window.

15. The base station of claim 10, wherein the at least one processor is configured to cause the base station to indicate scheduling of the SIB with the extended block size via scheduling information for a system information (SI) message.

16. The base station of claim 10, wherein the at least one processor is configured to cause the base station to transmit the SIB with the extended block size only in response to an on-demand request by a user equipment (UE).

17. The base station of claim 10, wherein the SIB with the extended block size carries dynamic information that is broadcast at a greater frequency than the SIB without the extended block size.

18. The base station of claim 10, wherein the SIB with the extended block size carries service-related information relevant to user equipments (UEs) of a visiting public land mobile network (VPLMN) and the SIB without the extended block size carries service-related information relevant to UEs of a home public land mobile network (HPLMN).

19. A user equipment (UE), comprising:
   at least one memory; and
   at least one processor coupled with the at least one memory and configured to cause the UE to:
      receive a system information block (SIB) with an extended block size in a system information (SI) message from a base station, wherein the extended block size is used in response to a physical layer size if the SIB being greater than a maximum configured physical layer message size of the SIB; and
      process the relevant information contained in the SIB with the extended block size in the SI message.

20. The UE of claim 19, wherein the at least one processor is configured to cause the UE to receive the SIB with the extended block size in response to an on-demand request transmitted by the UE.

* * * * *